US010626841B2

(12) United States Patent
Steinberger (10) Patent No.: US 10,626,841 B2
(45) Date of Patent: Apr. 21, 2020

(54) WINDING PLAN FOR A TRANSFORMER OF A STEP-UP CONVERTER AND IGNITION SYSTEM FOR SUPPLYING A SPARK GAP OF AN INTERNAL COMBUSTION ENGINE WITH ELECTRICAL POWER

(71) Applicant: Robert Bosch GmbH, Stuttgart (DE)

(72) Inventor: Werner Steinberger, Immenstadt (DE)

(73) Assignee: Robert Bosch GmbH, Stuttgart (DE)

( * ) Notice: Subject to any disclaimer, the term of this patent is extended or adjusted under 35 U.S.C. 154(b) by 110 days.

(21) Appl. No.: 15/327,160

(22) PCT Filed: May 21, 2015

(86) PCT No.: PCT/EP2015/061225
§ 371 (c)(1),
(2) Date: Jan. 18, 2017

(87) PCT Pub. No.: WO2016/008619
PCT Pub. Date: Jan. 21, 2016

(65) Prior Publication Data
US 2017/0218911 A1    Aug. 3, 2017

(30) Foreign Application Priority Data
Jul. 18, 2014  (DE) .......................... 10 2014 214 074

(51) Int. Cl.
*F02P 9/00*    (2006.01)
*H01F 27/32*    (2006.01)
(Continued)

(52) U.S. Cl.
CPC ............. *F02P 9/002* (2013.01); *F02P 3/0892* (2013.01); *F02P 13/00* (2013.01); *F02P 15/10* (2013.01);
(Continued)

(58) Field of Classification Search
CPC .. F02P 9/002; F02P 15/10; F02P 13/00; F02P 3/0892; H02M 3/33507; H01F 27/2823;
(Continued)

(56) References Cited

U.S. PATENT DOCUMENTS

| 6,002,319 A * | 12/1999 | Honma | H01F 27/38 336/178 |
| 2006/0158908 A1* | 7/2006 | Usui | H02M 3/33561 363/15 |
| 2015/0372459 A1* | 12/2015 | Deguchi | H01T 15/00 315/209 T |

FOREIGN PATENT DOCUMENTS

| CN | 1123883 A | 6/1996 |
| CN | 1132311 A | 10/1996 |

(Continued)

OTHER PUBLICATIONS

International Search Report for PCT/EP2015/061225, dated Dec. 17, 2015.

*Primary Examiner* — Xiao En Mo
(74) *Attorney, Agent, or Firm* — Norton Rose Fulbright US LLP; Gerard Messina (57) ABSTRACT

A step-up converter and an ignition system including a step-up converter are provided, which enable a better automated manufacture and reduced electrical insulation measures by a step-up converter constructed as follows: a transformer including a primary coil and a secondary coil galvanically isolated from the primary coil, the secondary coil being wound in multiple layers, and the primary coil being wound coaxially to the secondary coil over an outermost layer of the secondary coil, a first electrical terminal of the secondary coil branching off from an innermost layer of the secondary coil. The first electrical terminal of the sec- (Continued)

ondary coil is configured for electrical connection to a high-voltage terminal for the spark gap.

17 Claims, 6 Drawing Sheets

(51) Int. Cl.
*H01F 38/12* (2006.01)
*F02P 13/00* (2006.01)
*F02P 15/10* (2006.01)
*F02P 3/08* (2006.01)
*H01F 27/28* (2006.01)
*H01F 27/29* (2006.01)
*H02M 3/335* (2006.01)
*F02D 41/20* (2006.01)

(52) U.S. Cl.
CPC ..... *H01F 27/2823* (2013.01); *H01F 27/2828* (2013.01); *H01F 27/29* (2013.01); *H01F 27/325* (2013.01); *H01F 38/12* (2013.01); *H02M 3/33507* (2013.01); *F02D 2041/2027* (2013.01)

(58) Field of Classification Search
CPC .... H01F 27/29; H01F 27/325; H01F 27/2828; H01F 38/12; F02D 2041/2027
See application file for complete search history.

(56) References Cited

FOREIGN PATENT DOCUMENTS

| CN | 1837602 | A | 9/2006 |
| EP | 0984463 | A1 * | 3/2000 |
| WO | 2008148765 | A1 | 12/2008 |

* cited by examiner

WINDING PLAN FOR A TRANSFORMER OF A STEP-UP CONVERTER AND IGNITION SYSTEM FOR SUPPLYING A SPARK GAP OF AN INTERNAL COMBUSTION ENGINE WITH ELECTRICAL POWER

FIELD OF THE INVENTION

The present invention relates to a step-up converter and an ignition system for supplying electrical power to a spark gap of an internal combustion engine. In particular, the present invention relates to a coil geometry for enabling improved automated production of a transformer.

BACKGROUND INFORMATION

Ignition systems, which generate a high voltage with the aid of which combustible mixtures of a spark ignition internal combustion engine are ignited, are known in the related art. For improved controllability of the ignition spark energy, to reduce electrode wear and to achieve additional advantages, the related art provides for combining an ignition coil with a step-up converter, the step-up converter supplying electrical power to an ignition spark generated with the aid of the ignition coil. The step-up converter converts an input voltage into a higher output voltage. During the ON phase of the switch of the step-up converter, the inductor (storage choke) of the step-up converter is charged with power. With the switch open, this power is transferred to the output capacitor across the diode of the step-up converter. If the switch (for example, an IGBT or a MOSFET) is triggered by pulse width modulation, for example, then the output voltage is a function of the pulse duty factor, among other things. Such a storage choke is often designed as a toroidal core having a ferrite core gapped by an air gap in the related art. An output voltage of approximately 6 kV is typically required for use of a step-up converter in an ignition system. Electronic switches (for example, IGBT or MOSFET) generally cannot be used for such high voltages. Their maximum switching voltages are in the range of 600 V to 1000 V. However, due to the design of the storage choke as a transformer having a transformation ratio of 1:10 or 1/10, for example, the voltage at the switch may be reduced from approximately 6 kV to 600 V. Such a transformer could also be designed as a toroidal core, for example. However, the disadvantages here are obvious to those skilled in the art:
  Toroidal core windings are difficult to automate.
  The wire ends are mostly tin-plated and must be selectively soldered to the circuit board.
  The output voltage of 6 kV, for example, must be insulated with respect to the ferrite core, which may be comparatively complex and may be achieved, for example, by extrusion coating.
  The secondary winding must be electrically insulated with respect to the primary winding. Wires for these voltages are virtually unavailable on the market. The outside diameters of the available wires are too large for use in a toroidal core transformer, the volume of which is to be kept preferably small. Foil insulations between the primary winding and the secondary winding are also impossible, given the intended overall size.

One possible design for the transformer to be used according to the present invention includes a multipart shell-core design (for example, in two parts, three parts or four parts) including a ferrite core gapped by an air gap. The primary winding and the secondary winding here are wound onto a coil bobbin, the wire ends are placed in contact pockets and contacted by cold contact (for example, by an insulation displacement connection (ID connection)). The contact with the circuit board may include a solder connection or cold contact, such as a Flex Pin, for example.

However, the disadvantages mentioned above, in particular with regard to the required insulation, are not solved with the shell-core transformers known in the related art.

SUMMARY

The present invention meets the demand identified above by a step-up converter for supplying electrical power to a spark gap of a spark ignition internal combustion engine. Even if use in an ignition system is described for the purpose of illustration within the scope of the present invention, use of the step-up converter according to the present invention in other environments is also possible, so that the reference to a spark gap and its terminals is to be understood merely as an example. The step-up converter includes a transformer including a primary coil and a secondary coil. The secondary coil is wound in multiple layers and the primary coil is wound coaxially to the secondary coil over an outermost layer of the secondary coil. The windings of the transformer itself may be galvanically separated from one another. The wires of the coils may therefore be insulated electrically from one another by thin enamel layers, for example. Both the secondary coil and the primary coil each have a first electrical terminal and a second electrical terminal. The first electrical terminal of the secondary coil branches off from an innermost layer of windings of the secondary coil. According to the present invention, this first electrical terminal of the secondary coil is provided and/or configured for electrical connection to a high-voltage terminal, for example, for the spark gap. For example, an electrical connection to the secondary coil of a primary voltage generator (e.g., ignition coil) may be provided in this context. In other words, the electrical terminal of the secondary coil, via which the electrical power of a spark gap of an ignition system, for example, is supplied, is situated in the coil base (also referred to as the "chamber base"). The electrical terminal is at a maximum distance from the primary coil of the transformer in this way, so that the measures for electrical insulation of the first electrical terminal may be minimized. The present invention in this way enables good automatability in electrical insulation measures for a transformer, which only minimally increase the volume of the transformer.

Preferably a second electrical terminal of the secondary coil and alternatively or additionally a first electrical terminal of the primary coil may be assigned to an input voltage in the vehicle electrical system. The first electrical terminal of the primary coil may branch off in particular from a winding of the primary coil, which is at a minimum distance from the secondary coil.

In other words, this winding may be situated directly on an outermost layer of the secondary coil. The arrangement mentioned above promotes a maximum distance of the terminals having the greatest potential differences during operation, so that the insulation measures may be further reduced.

A second electrical terminal of the primary coil may be assigned to a low-voltage terminal for the spark gap via a controllable switch. The controllable switch may be designed as an IGBT or a MOSFET, for example. In other words, the second electrical terminal of the primary coil is assigned to that terminal of the spark gap, which is electrically opposite the first electrical terminal of the secondary coil.

The primary coil of the transformer used according to the present invention may preferably also be wound in multiple layers, and the first terminal of the primary coil may branch off from an innermost layer of the primary coil. A maximum electrical distance for the electrical potentials of the terminals is also obtained when the second terminal of the primary coil branches off from an outermost layer of the primary coil. The least possible additionally required electrical insulation of winding wires with respect to one another is achievable in this way.

The transformer may additionally include a coil bobbin having a preferably essentially rotationally symmetrical base body for improved automatability of its production. The base body is preferably equipped with a chamber base and chamber walls connected to the chamber base on both sides, so that the secondary coil is wound directly onto the chamber base between the chamber walls, and the primary coil is wound onto the outermost layer of the secondary coil between the chamber walls. On the one hand, this yields a simplified reversal of direction by arranging the windings side by side due to the chamber walls. On the other hand, this ensures that the windings of the coils are and will remain situated in a preferably compact manner. In particular, the chamber walls may be situated essentially in parallel to one another and may be designed essentially in the form of ring disks. An innermost edge of the chamber walls may thus be connected to the chamber base, which is designed to be essentially a hollow cylinder. In this way, the coils of the transformer are housed by the coil bobbin on three sides, thereby additionally permitting accurate placement in a toroidal core.

A pocket for spatial fixation of the terminal wires may be situated on the coil bobbin according to the principle of an ID connection. The electrical terminals may permit cold contact (ID connection or the like). In particular, the clamping element may be situated on the coil bobbin in such a way that the first electrical terminal of the secondary coil is led out of the coil bobbin in the area of the chamber base and is brought up to the clamping element outside of the chamber walls. In this way, a chamber wall insulates the first electrical terminal of the secondary coil from all windings of the transformer. Even for the case when the first electrical terminal would be affected with regard to its electrical insulation, insulation by the chamber wall will continue to exist reliably with respect to the windings of the transformer.

The transformer may have a transformation ratio between 1:5 and 1:20, in particular between 1:8 and 1:15, preferably 1:10. The transformation ratio is determined by the output voltage and the maximum switching voltage of the switch used (for example, IGBT/MOSFET). A secondary-side voltage in the range of 6 kV may be switched in this way without any risk to the controllable switch in a primary-side loop of the transformer.

The coil bobbin may be inserted into a ferrite core or a laminated core to support the guidance of the magnetic field. The ferrite core or the laminated core may be constructed of two core halves, which are brought up to the coil bobbin from opposite sides. For example, the core halves may be designed to be in mirror symmetry with one another. On the opposing surfaces, the core halves preferably have ring-shaped or partially ring-shaped cavities to accommodate the coil bobbin. Each of the core halves protrude into the coil bobbin with a cylindrical core segment. In the area of the ferrite core or laminated core penetrating proportionally into the coil bobbin, it may be provided that the two core halves do not come in contact even in the completely assembled state. This yields a predefined air gap between the two core halves.

According to a second aspect of the present invention, an ignition system having a spark gap for spark ignition of a combustible mixture of an internal combustion engine is provided, including a step-up converter such as that described in detail in conjunction with the first aspect of the present invention mentioned above. The step-up converter supplies electrical power to an ignition spark at the spark gap. In other words, the ignition system initially generates an igniting spark with the aid of a primary voltage generator, this ignition spark is supplied with electrical power via the step-up converter designed according to the present invention and is thus maintained in a controlled manner. The first electrical terminal of the secondary coil is electrically connected to a high-voltage terminal of the spark gap. According to the preceding explanation, a second electrical terminal of the primary coil may be electrically connected to a low-voltage terminal of the spark gap. Alternatively or additionally, the second electrical terminal of the secondary coil and, alternatively or additionally, the first electrical terminal of the primary coil may be assigned to a vehicle input voltage. In other words, the latter electrical terminals may be situated beyond the transformer from the standpoint of the spark gap.

The second terminal of the primary coil may be set up to generate the output voltage of the step-up converter in order to be connected electrically to the low-voltage terminal of the spark gap with the aid of a controllable switch (for example, in the form of an IGBT or a MOSFET). The frequency and the pulse duty factor of the step-up converter and thus its output-side power delivery are controlled via the controllable switch.

Due to the wiring of the windings of the transformer according to the present invention, the voltage load for the individual wire is reducible. With regard to the winding technology, a secondary coil having eight layers, for example, may initially be manufactured onto which the primary coil is then wound directly. In addition, an optional foil layer may be placed between the primary coil and the secondary coil to further improve the electrical insulation of the two coils with respect to one another. The voltage load for the wire insulation of the secondary coil is reduced in this way to the output-side voltage of the step-up converter divided by the number of layers of the secondary winding (in this example: 6 kV/8=750 V). Even simple enameled copper wires of the "grade 2" specification or a higher specification are capable of providing long-term insulation of this voltage. With an increase in the number of layers, the voltage load on the wire insulation may be further reduced. The voltage at the controllable switch, which connects the secondary coil to the low-voltage terminal of the spark gap during operation, is reduced to 600 V, for example, at a transformation ratio of 1:10. IGBTs or MOSFETs are commercially available for this voltage. The second terminal of the primary coil and the first terminal of the secondary coil receive the vehicle electrical system voltage (e.g., 12 V) at the input.

Both electrical terminals of the secondary coil may preferably be led out on the outside of the coil bobbin (outside of the chamber walls), while the electrical terminals of the primary coil are installed on the inside (between the chamber walls). In the case of a symmetrical design of the coil bobbin, the polarity of the output voltage and the terminal configuration/pin configuration of the transformer are easily interchangeable.

BRIEF DESCRIPTION OF THE DRAWINGS

FIG. 4b shows an exploded drawing of the transformer illustrated in FIG. 4a.

DETAILED DESCRIPTION

Figure 1:
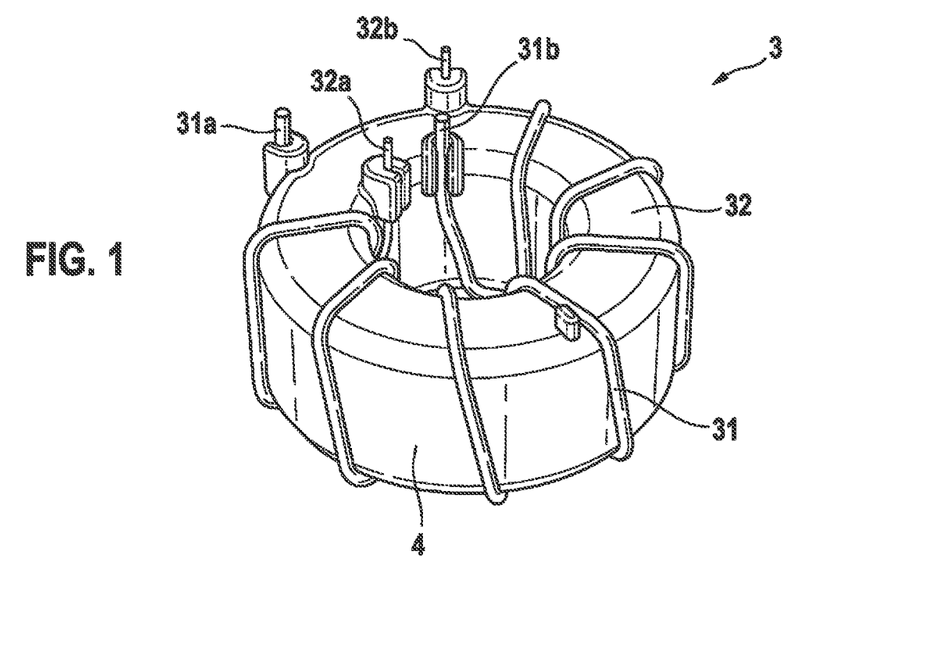
FIG. 1 shows a perspective view of a traditional transformer, usable for a step-up converter.

FIG. 1 shows a perspective representation of a transformer 3 according to the related art. A molded-in ferrite core 4 contains a secondary winding 32, whose electrical terminal 32a is led out on the inside of the ring-shaped core and whose electrical terminal 32b is led out on the outside of ring-shaped ferrite core 4. A primary winding 31, whose electrical terminal 31a is led out on the outside of ferrite core 4 and whose electrical terminal 31b is led out on the inside of ferrite core 4, is wound onto the secondary winding. It is apparent that it is difficult to manufacture the model of transformer 3 illustrated here in an automated manner.

Figure 2:
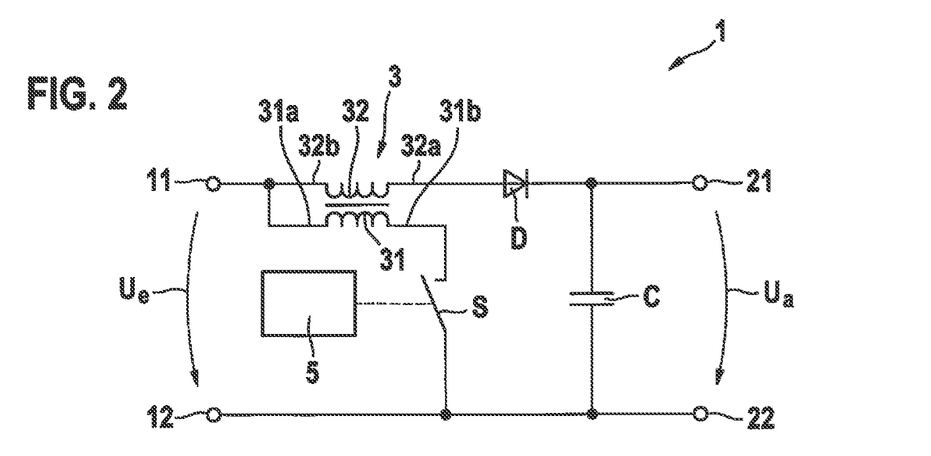
FIG. 2 shows a schematic diagram of a step-up converter according to one exemplary embodiment of the present invention.

FIG. 2 shows a diagram of a step-up converter 1 according to the present invention, whose input-side terminals 11, 12 are acted on by a vehicle electrical system voltage $U_e$ to supply an output-side high voltage $U_a$ for a spark gap (not shown) to output-side terminals 21, 22. A transformer 3 is integrated into step-up converter 1 illustrated here, in such a way that its secondary coil 32 functions as a choke coil for charging an output-side capacitor C. A diode D here helps to prevent a reflux of the charge stored in capacitor C via transformer 3. Transformer 3 is used to reduce the stresses occurring on switch S. Primary coil 31 of transformer 3 is therefore connected to a low-voltage terminal 22 of the spark gap via a switch S, which is controlled by a control unit 5. It is apparent that a first electrical terminal 31a of primary coil 31 and a second electrical terminal 32b of secondary coil 32 are at an identical potential, corresponding to input voltage $U_e$. However, for second electrical terminal 31b of primary coil 31 and first electrical terminal 32a of secondary coil 32, substantial potential differences are to be expected during operation due to the transformation ratio of transformer 3. The winding plan provided according to the present invention and described in detail in conjunction with the following figures, permit a design with little effort with regard to additional electrical insulation measures.

Figure 3:
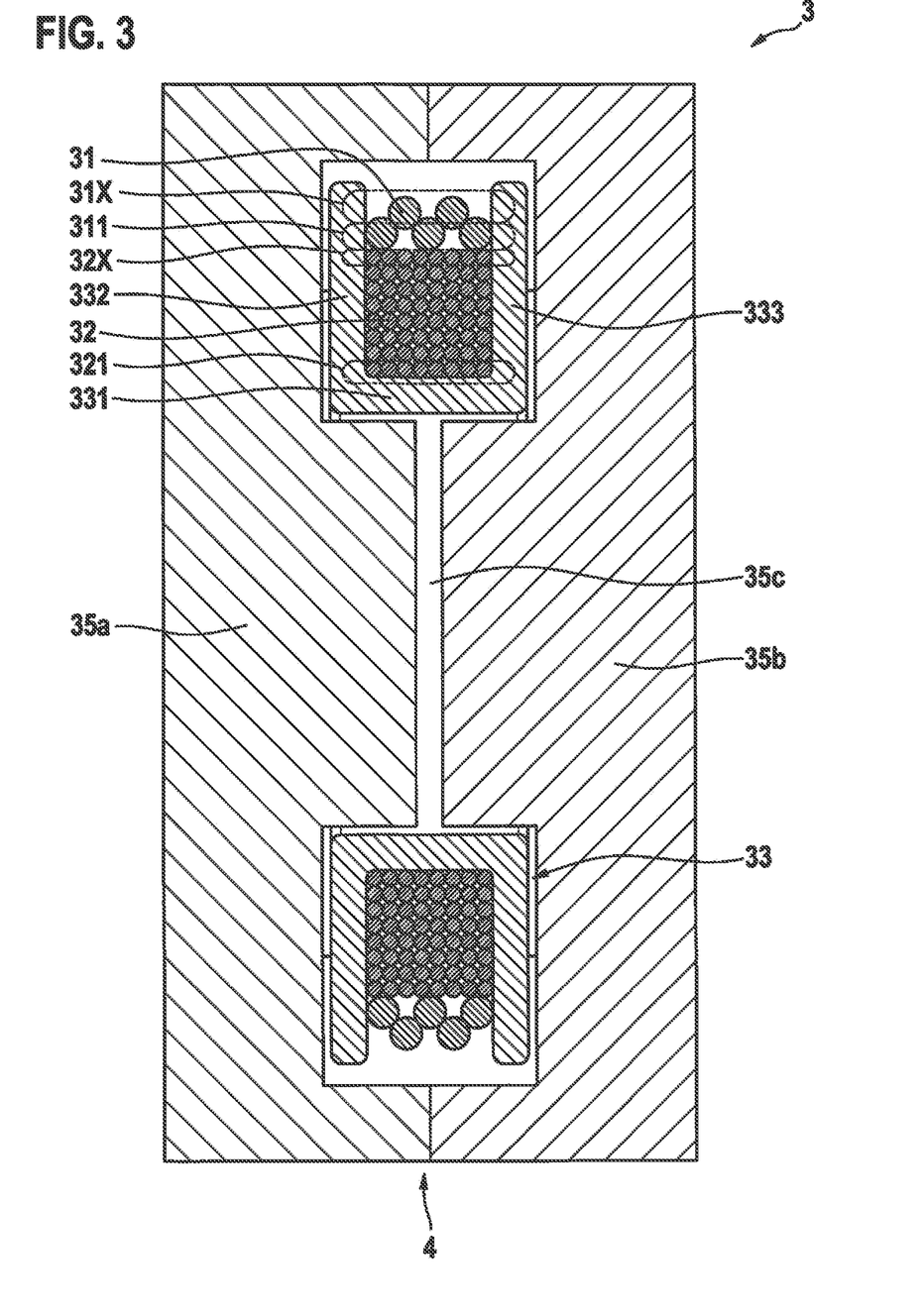
FIG. 3 shows a sectional representation of an exemplary embodiment of a transformer according to the present invention, designed as a two-part switch core transformer.

FIG. 3 shows a sectional representation through a transformer 3, whose primary coil 31 and secondary coil 32 are inserted into a coil bobbin 33, which is in turn inside a ferrite core 4 constructed symmetrically of a first core half 35a and a second core half 35b. The area of core halves 35a, 35b penetrating at least proportionally through the coil bobbin has an air gap 35c because core halves 35a, 35b do not come in contact in this area. Coil bobbin 33 has a U-shaped cross section running along a circular path in the winding direction, two chamber walls 332, 333 situated in parallel to one another being connected to chamber base 331 thereof. A first layer 321 of secondary coil 32 is wound directly onto chamber base 331. The first electrical terminal (not shown) of secondary coil 32 is led out of this layer 321. An outermost layer 32X of secondary coil 32 is connected to the second electrical terminal (not shown) of secondary coil 32. An innermost layer 311 of primary coil 31, to which a first electrical terminal (not shown) of primary coil 31 is connected, is wound directly onto outermost layer 32X of secondary coil 32. Primary coil 31 shown here has only two layers, from the outermost layer 31X a second electrical terminal (not shown) branches off.

Figure 4A:
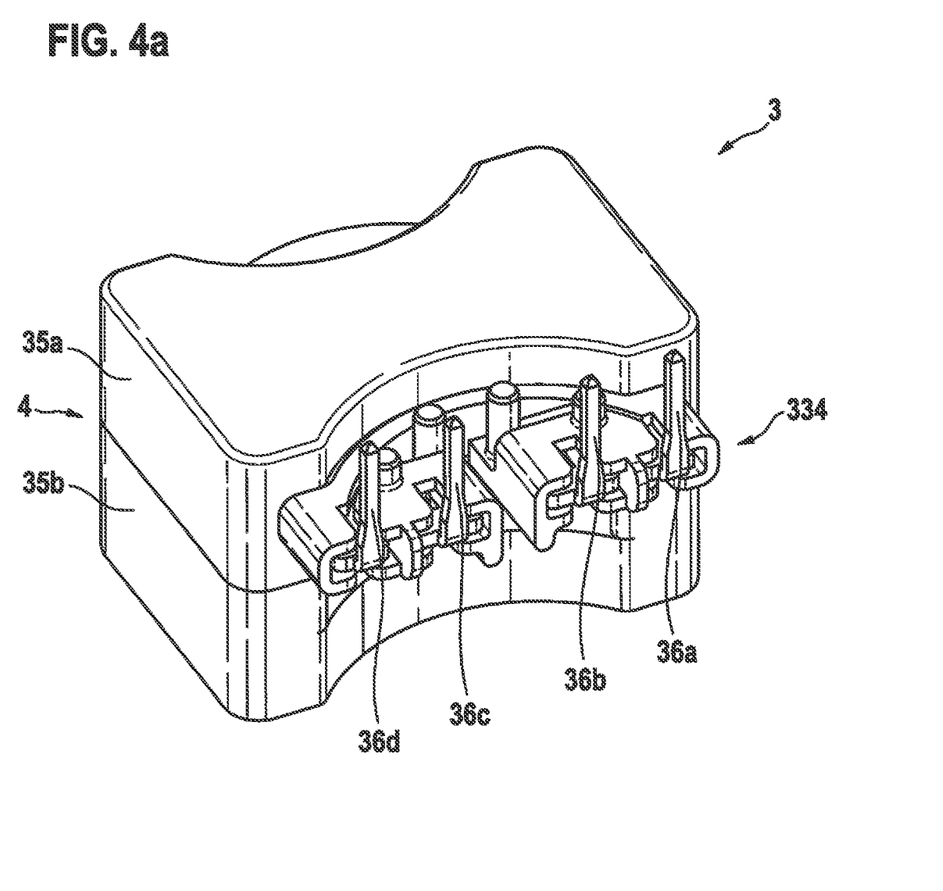
FIG. 4a shows a perspective view of an exemplary embodiment of a transformer according to the present invention.

FIG. 4a shows a perspective view of a transformer 3, which is designed according to the present invention and whose coils (not shown) are enclosed in two core halves 35a, 35b of a ferrite core 4. A pocket 334 is situated outside of ferrite core 4, having clamping elements 36a, 36b 36c, 36d for external electrical contacting.

Figure 4B:
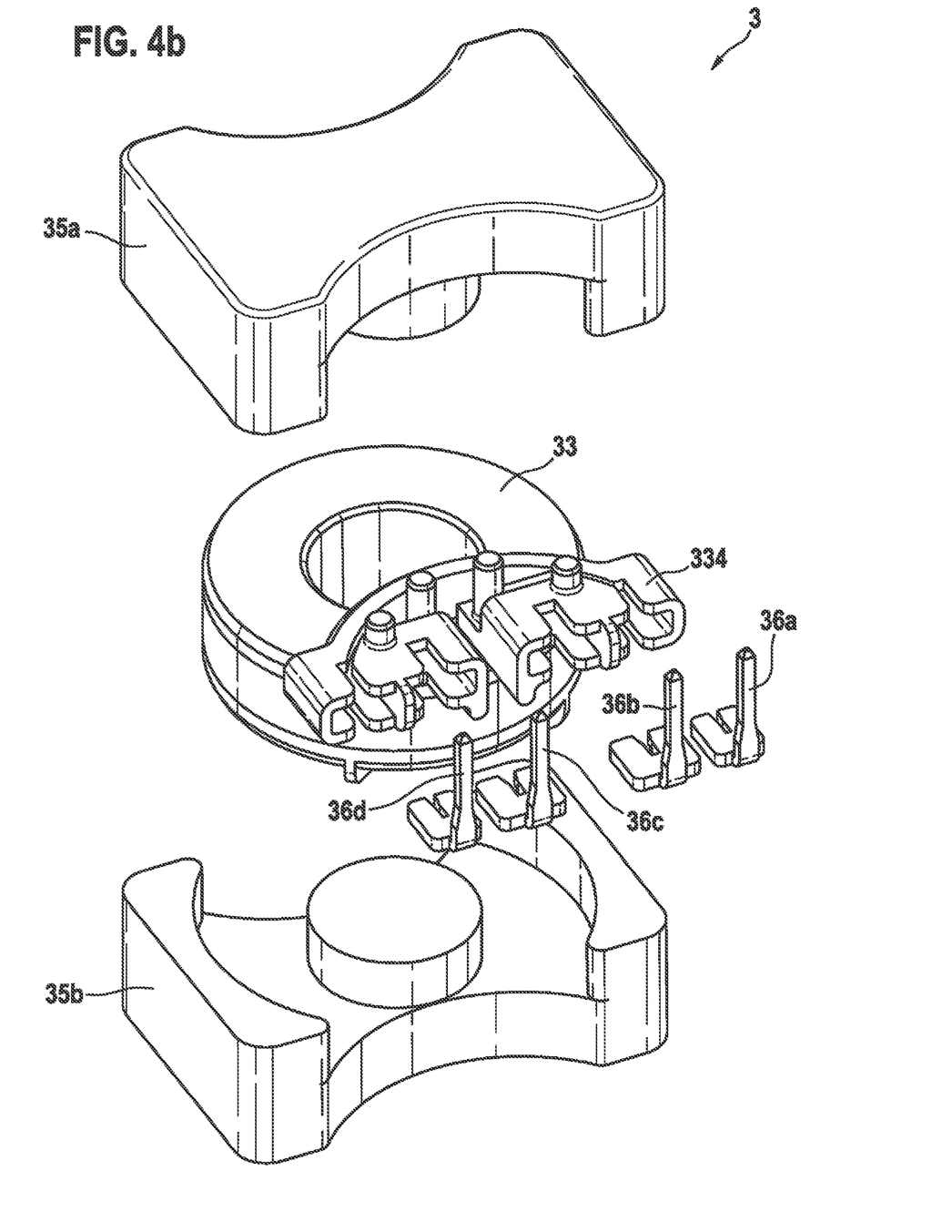

FIG. 4b shows transformer 3, which is illustrated in FIG. 3a in an exploded diagram, in which coil bobbin 33 is shown with a pocket 334 and with clamping elements 36a, 36b, 36c, 36d.

Figure 5A:
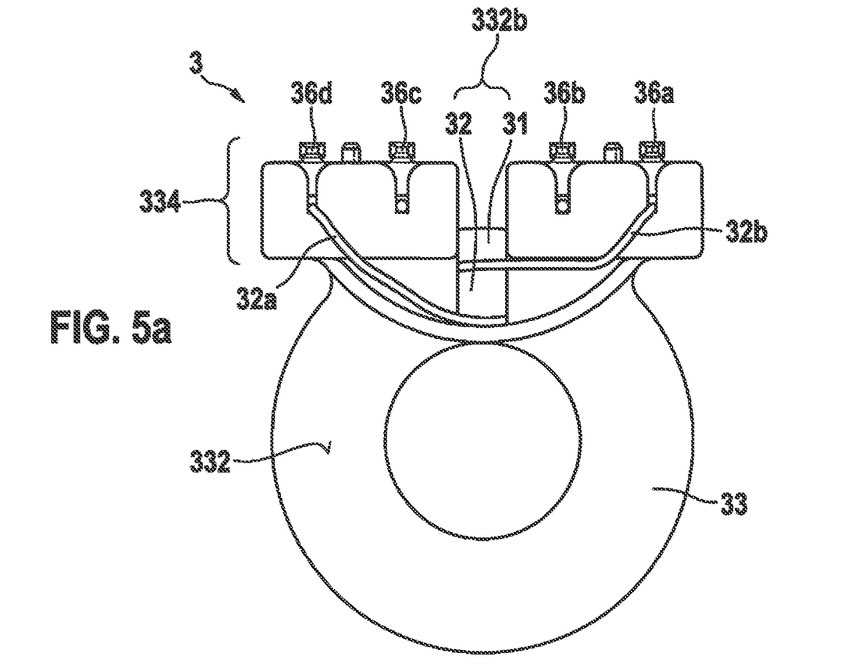
FIGS. 5a and 5b show side views illustrating preferred positions of the terminals of the coils of the transformer according to the present invention.

FIG. 5a shows a side view of an exemplary embodiment of a transformer 3, illustrating the leading of electrical terminals 32a, 32b of secondary coil 32 to clamping element 36a and 36d. First electrical terminal 32a of secondary coil 32 is laid through a recess 332b in chamber wall 332 of coil bobbin 33, from the innermost layer of secondary coil 32 outside of chamber wall 332 to clamping element 36d. Second electrical terminal 32b of secondary coil 32 is led through the same recess 332b in chamber wall 332 of coil bobbin 33 to clamping element 36a. Electrical terminals 31a, 31b of primary coil 31 are led from the opposite side to clamping elements 36b, 36c and electrically connected thereto.

Figure 5B:
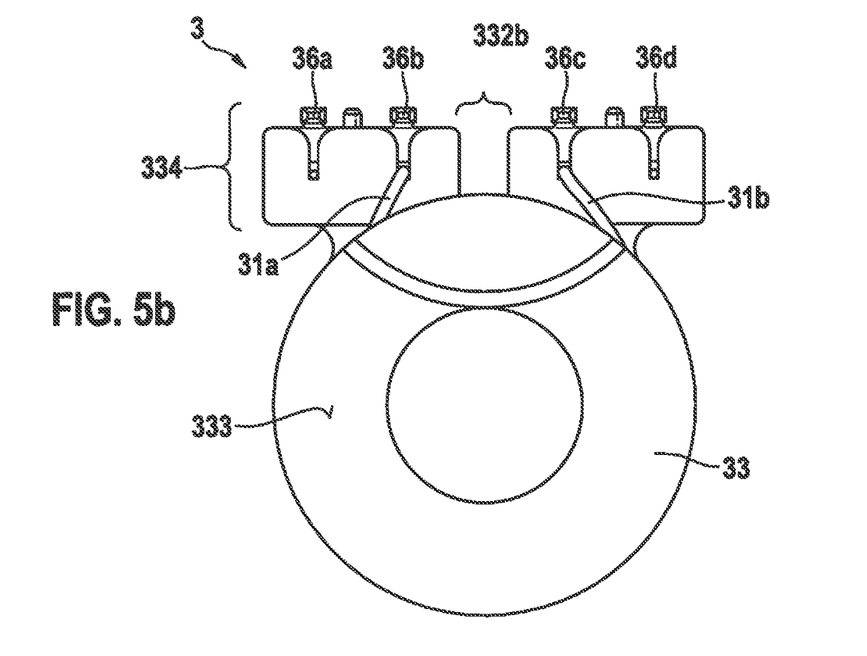

FIG. 5b shows a 180° rotated view of transformer 3 as described in conjunction with FIG. 5a. Chamber wall 333 of coil bobbin 33, which is now arranged at the front, does not have any recess. Electrical terminals 31a, 31b of primary coil 31 are led between chamber walls 332, 333 in the direction of pocket 334, where they are electrically connected to clamping elements 36b, 36c.

Figure 6:
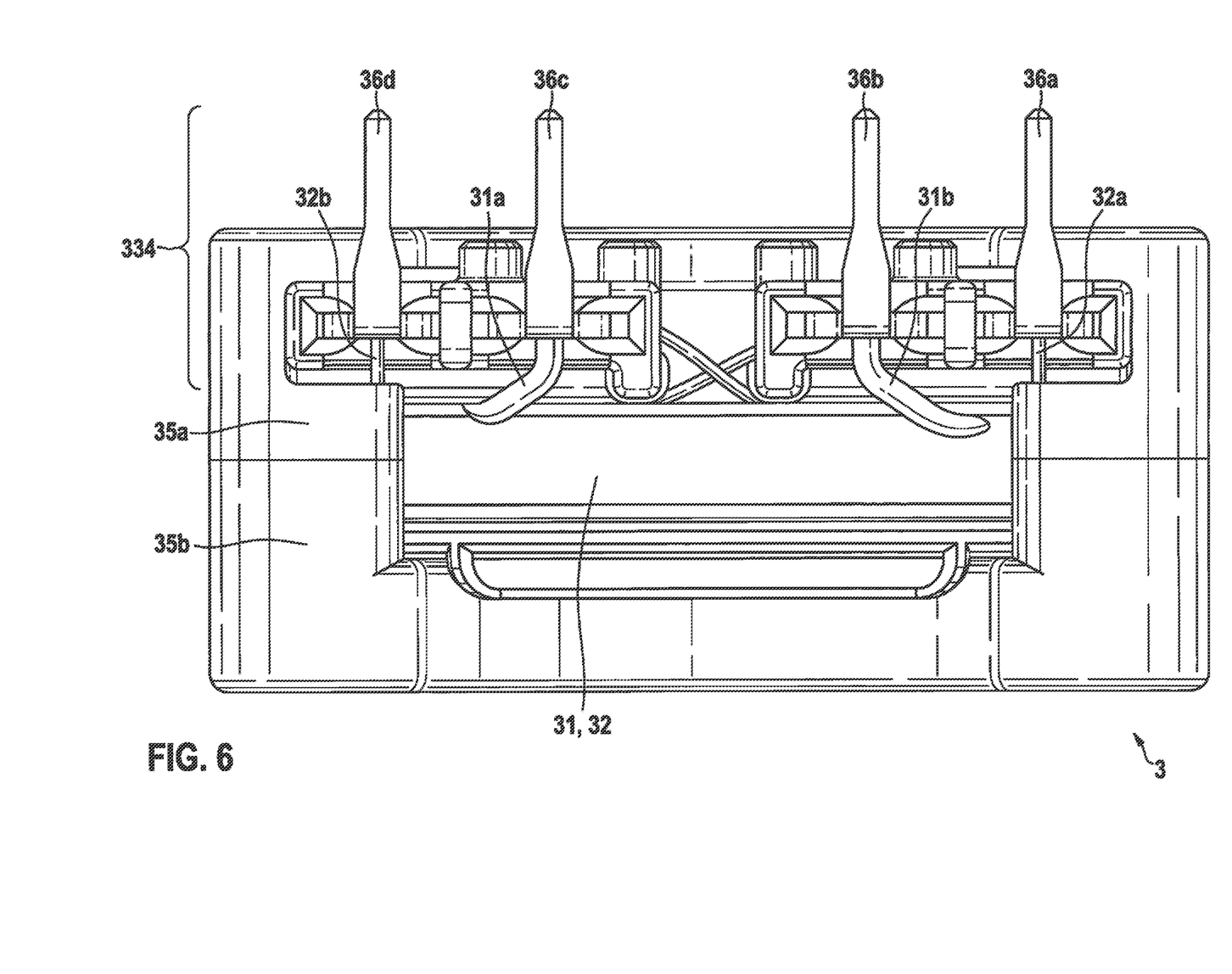
FIG. 6 shows a top view of one exemplary embodiment of a transformer according to the present invention.

FIG. 6 shows a top view of a pocket 334 of an exemplary embodiment of a transformer 3 designed according to the present invention. Apparently, electrical terminals 31a, 31b of primary coil 31 are electrically connected to clamping elements 36b, 36c. Their diameters are larger than those of electrical terminals 32a, 32b of secondary coil 32, which are electrically connected to outer clamping elements 36a, 36d.

What is claimed is:

1. A step-up converter for supplying electrical power to a spark gap of an internal combustion engine, comprising:
   a transformer including a primary coil and a secondary coil, wherein:
     the secondary coil is wound in multiple layers,
     the primary coil is wound coaxially to the secondary coil over an outermost layer of the secondary coil,
     a first electrical terminal of the secondary coil is extended from an innermost layer of the secondary coil, and
     the first electrical terminal of the secondary coil is configured for electrical connection to a high voltage terminal for the spark gap,
   wherein the transformer includes a coil bobbin which is enclosed in two core halves of a ferrite core, wherein an area of the two core halves penetrating at least proportionally through the coil bobbin has an air gap.

2. The step-up converter as recited in claim 1, wherein at least one of a second electrical terminal of the secondary coil and a first electrical terminal of the primary coil is assigned to a vehicle electrical system input voltage.

3. The step-up converter as recited in claim 1, further comprising:
a controllable switch via which a second electrical terminal of the primary coil is assigned to an electrical ground.

4. The step-up converter as recited in claim 3, wherein the electrical ground is an electrical potential of the spark gap opposite the high-voltage terminal.

5. The step-up converter as recited in claim 3, wherein the controllable switch includes one of an IGBT and a MOSFET.

6. The step-up converter as recited in claim 2, wherein:
the primary coil is wound in multiple layers,
the first electrical terminal of the primary coil is electrically connected to an innermost layer of the primary coil, and
the second electrical terminal of the primary coil branches off an outermost layer of the primary coil.

7. The step-up converter as recited in claim 2, wherein:
the coil bobbin includes an essentially rotationally symmetrical base body,
the coil bobbin includes a chamber base and chamber walls connected to the chamber base on both sides,
the secondary coil is wound on the chamber base between the chamber walls, and
the primary coil is wound onto the outermost layer of the secondary coil between the chamber walls.

8. The step-up converter as recited in claim 7, wherein at least one of:
the coil bobbin includes a pocket for spatial fixation and electrical contacting of the first and second electrical terminals of the primary coil and the first and second electrical terminals of the secondary coil, and
the first electrical terminal of the secondary coil is electrically insulated from the primary coil by one of the chamber walls of the base body.

9. The step-up converter as recited in claim 1, wherein the transformer has a transformation ratio between 5 and 30.

10. The step-up converter as recited in claim 1, wherein the transformer has a transformation ratio between 7 and 20.

11. The step-up converter as recited in claim 1, wherein the transformer has a transformation ratio between 8 and 15.

12. The step-up converter as recited in claim 1, wherein the primary coil and the secondary coil are made of enameled copper wires.

13. An ignition system having a spark gap for spark ignition of a combustible mixture of an internal combustion engine, the system comprising:
a step-up converter for supplying electrical power to a spark gap of an internal combustion engine, the converter including a transformer including a primary coil and a secondary coil, wherein:
the secondary coil is wound in multiple layers,
the primary coil is wound coaxially to the secondary coil over an outermost layer of the secondary coil,
a first electrical terminal of the secondary coil is extended from an innermost layer of the secondary coil,
the first electrical terminal of the secondary coil is configured for electrical connection to a high voltage terminal for the spark gap, and
the first electrical terminal of the secondary coil is connected to the high-voltage terminal of the spark gap,
wherein the transformer includes a coil bobbin which is enclosed in two core halves of a ferrite core,
wherein an area of the two core halves penetrating at least proportionally through the coil bobbin has an air gap.

14. The ignition system as recited in claim 13, wherein the step-up converter includes a controllable switch via which a second electrical terminal of the primary coil is assigned to an electrical ground.

15. The ignition system as recited in claim 14, wherein the electrical ground is an electrical potential of the spark gap opposite the high-voltage terminal.

16. The ignition system as recited in claim 14, wherein the controllable switch includes one of an IGBT and a MOSFET.

17. A step-up converter for supplying electrical power to a spark gap of an internal combustion engine, comprising:
a transformer including a primary coil and a secondary coil, wherein:
the secondary coil is wound in multiple layers,
the primary coil is wound coaxially to the secondary coil over an outermost layer of the secondary coil,
a first electrical terminal of the secondary coil is extended from an innermost layer of the secondary coil, and
the first electrical terminal of the secondary coil is configured for electrical connection to a high voltage terminal for the spark gap,
wherein the transformer includes a coil bobbin which is enclosed in two core halves of a ferrite core,
wherein an area of the two core halves penetrating at least proportionally through the coil bobbin has an air gap,
wherein at least one of a second electrical terminal of the secondary coil and a first electrical terminal of the primary coil is assigned to a vehicle electrical system input voltage
wherein:
the primary coil is wound in multiple layers,
the first electrical terminal of the primary coil is electrically connected to an innermost layer of the primary coil, and
the second electrical terminal of the primary coil is electrically connected to an outermost layer of the primary coil,
wherein:
the coil bobbin includes an essentially rotationally symmetrical base body,
the coil bobbin includes a chamber base and chamber walls connected to the chamber base on both sides,
the secondary coil is wound on the chamber base between the chamber walls, and
the primary coil is wound onto the outermost layer of the secondary coil in the same chamber of the coil bobbin,
wherein there is only one coil bobbin.

* * * * *